United States Patent [19]

Smith

[11] 4,119,329

[45] Oct. 10, 1978

[54] FARM APPARATUS

[76] Inventor: L. Eugene Smith, R.R. 2 Box 407, Lebanon, Ind. 46252

[21] Appl. No.: 806,742

[22] Filed: Jun. 15, 1977

[51] Int. Cl.² ............................................. B62D 53/00
[52] U.S. Cl. ........................... 280/415 R; 172/625
[58] Field of Search .......... 280/415 R, 415 A, 411 R, 280/411 A, 412, 413, 491 R, 491 C, 482, 491 D; 172/248, 625

[56] References Cited

U.S. PATENT DOCUMENTS

| | | | |
|---|---|---|---|
| 2,878,035 | 3/1959 | Downey | 280/482 |
| 3,288,480 | 11/1966 | Calkins | 280/411 A X |
| 3,437,353 | 4/1969 | Lange | 280/415 R |
| 3,635,495 | 1/1972 | Orendorff | 280/482 |
| 4,026,365 | 5/1977 | Andersson | 280/415 R |

*Primary Examiner*—Robert R. Song
*Assistant Examiner*—R. Schrecengost
*Attorney, Agent, or Firm*—Woodard, Weikart, Emhardt & Naughton

[57] ABSTRACT

A farm apparatus is disclosed herein which includes a tool bar for mounting various farm attachments, such as planters, thereto. A first pair of wheels are mounted at one end of the tool bar and are oriented to permit transportation of the tool bar along its longitudinal axis. A second pair of wheels are mounted at the second end of the tool bar, and are castered to permit movement of the tool bar either along or perpendicular to the longitudinal axis. The first and second pairs of wheels are operable to be raised to permit the farm attachments mounted on the tool bar to engage the ground. An arm is pivotally mounted to the tool bar having a first position parallel to the tool bar for transporting the apparatus to and from the field and a second position perpendicular to the tool bar for use of the apparatus in the field.

16 Claims, 12 Drawing Figures

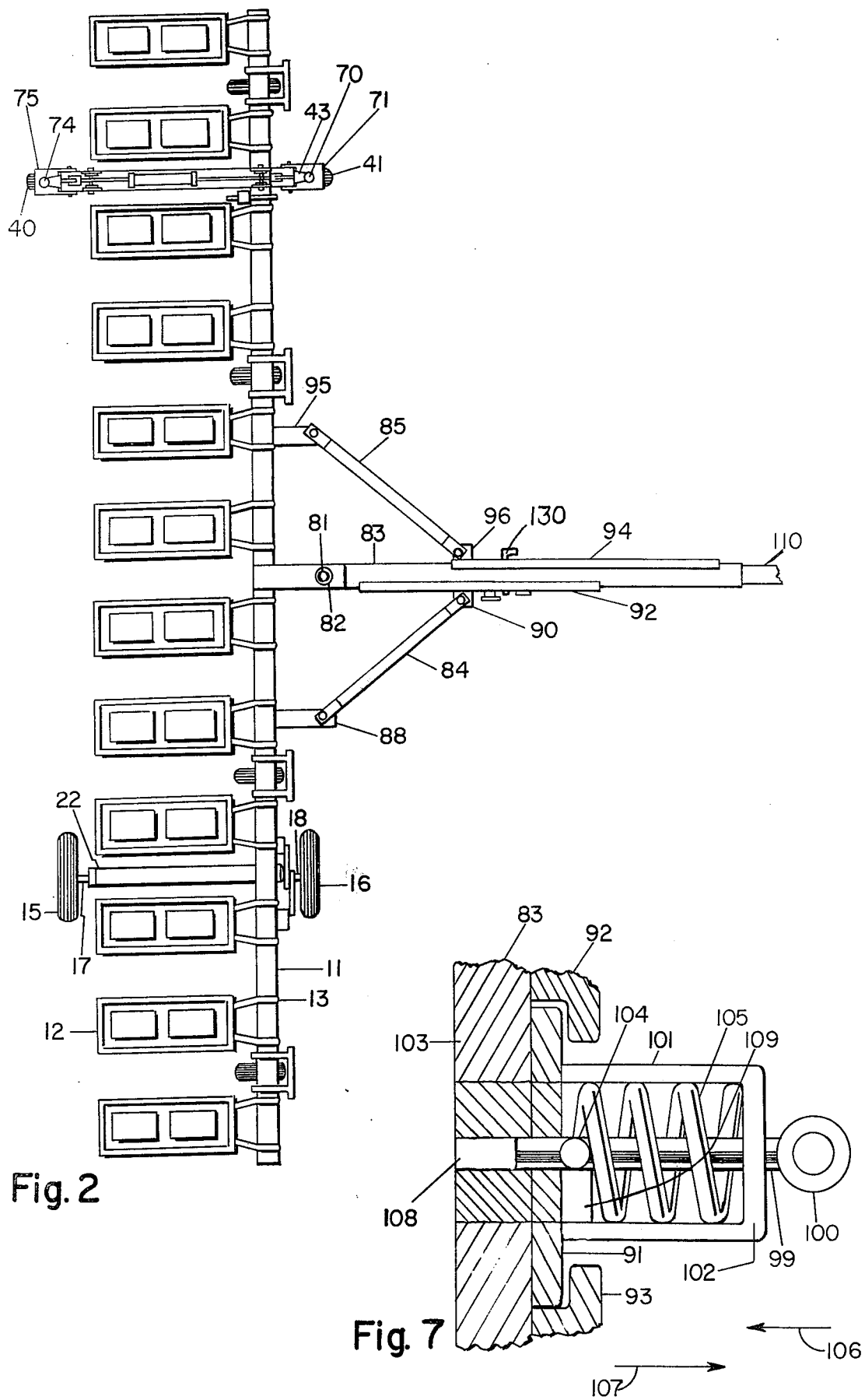

FARM APPARATUS

BACKGROUND OF THE INVENTION

1. Field of the Invention

The present invention relates to a farm apparatus including a tool bar for mounting various farm implements thereon, and more particularly, to an apparatus including an arm which may be pivoted from a transport position to a field position without disengagement of the tractor from the arm.

2. Description of the Prior Art

A variety of farming equipment is known in the prior art which provides for several farm implements to be mounted upon a tool bar. The implements are interchangeable to permit the tool bar to support a variety of equipment, such as plows or planters. The tool bar and associated equipment are generally moved in the field by a tractor attached to an arm or other supporting structure connected to the tool bar. The problem exists, however, in transporting the farm apparatus to and from the field since the tool bar and associated equipment may have substantial width.

One method for overcoming the problem of transporting the farm apparatus to and from the field has been to provide for the apparatus to fold into a more compact unit for transportation. In U.S. Pat. No. 3,161,164, issued to Tanke on Dec. 15, 1964, there is disclosed a planter which includes row markers extending outwardly from the main apparatus. The row markers, as is customary in the art, are constructed to fold toward the main part of the planter to provide a unit of less width for transportation purposes. In U.S. Pat. No. 3,799,272, issued to Watson on Mar. 26, 1974, there is disclosed a six- and eight-row cultivator and planter frame which also provides for collapsing of the frame for transportation. In the Watson device, the row markers and portions of the frame itself are folded vertically to reduce the overall width of the unit during transportation. Similar devices are shown in U.S. Pat. Nos. 3,131,773, issued to Cox on May 5, 1964; U.S. Pat. No. 3,670,823, issued to Matthews et al. on June 20, 1972; and, U.S. Pat. No. 3,454,103, issued to Krumholz on July 8, 1969. A folding boom assembly of comparable design and purpose is described in U.S. Pat. No. 3,747,148, issued to Hitchcock on July 24, 1973.

Another approach to this problem has been the provision of tool bar constructions in which the apparatus is towed endwise in transporting it to and from the field. Thus, the tool bar which may support as many as twelve or even twenty-four planting units in the field would have a considerable length, but could be towed endwise to and from the field. However, the tool bar constructions in the prior art have required that the tractor or other vehicle be separated from the device in the field and reconnected at the end of the tool bar for transportation. It is an inconvenient and frequently difficult task to accomplish such a change by a single operator of the device while in the field. The physical requirements of making the disconnection and connection and the uneven terrain in the field may render it virtually impossible for a single person to accomplish the change in a reasonable length of time.

With the development of farming technology, it has been possible to use farming implements which are capable of discing, planting, or otherwise treating a large number of rows in the field with one pass. With this increase in the size of farm equipment, it has become increasingly necessary to provide for new methods of transporting the equipment to and from the field. The present invention provides a simple mechanism by which a tool bar apparatus having a substantial width in the field may be changed from the field position to the transport position without disengagement of the tractor therefrom.

SUMMARY OF THE INVENTION

One embodiment of the present invention provides a farm apparatus comprising a frame including an elongated tool bar having a first end and a second end, first attaching means for securing farm implements to the tool bar, a first wheel assembly mounted to the frame near the first end of the tool bar, the first wheel assembly including a wheel rotatable about a horizontal axis, first mount means for mounting the first wheel assembly to the frame to be pivotable about a vertical axis, a second wheel assembly mounted to the frame near the second end of the tool bar, the second wheel assembly including a wheel rotatable about a horizontal axis, second mount means for mounting the second wheel assembly to the frame, means for vertically moving the first and second wheels relative the frame, the first and second wheels having a first position in contact with the ground and a second position above the ground, an arm attached to the frame, second attaching means for attaching the arm to the frame to be pivotable about a vertical axis with respect to the frame, the arm having a first position parallel to the tool bar and a second position perpendicular to the tool bar, first locking means for locking the arm in the first position, and second locking means for locking the arm in the second position.

It is an object of the present invention to provide a farm apparatus including a tool bar capable of supporting several farm implements.

Another object of the present invention is to provide a farm apparatus which includes a tool bar of substantial length which is moved perpendicular to its longitudinal axis while in the field, and which is moved along its longitudinal axis while being transported to and from the field.

It is a further object of the present invention to provide a farm apparatus which includes an arm pivotally mounted to a tool bar to permit the apparatus to be changed from the field condition to the transport condition without disengagement of the pulling vehicle.

Further objects and advantages of the present invention will become apparent from the description of the preferred embodiment which follows.

BRIEF DESCRIPTION OF THE DRAWINGS

FIG. 2 is a top, plan view of the present invention shown in the field condition.

FIG. 7 is a side, cross-sectional view of the locking pin utilized by the present invention.

DESCRIPTION OF THE PREFERRED EMBODIMENT

Figure 1:
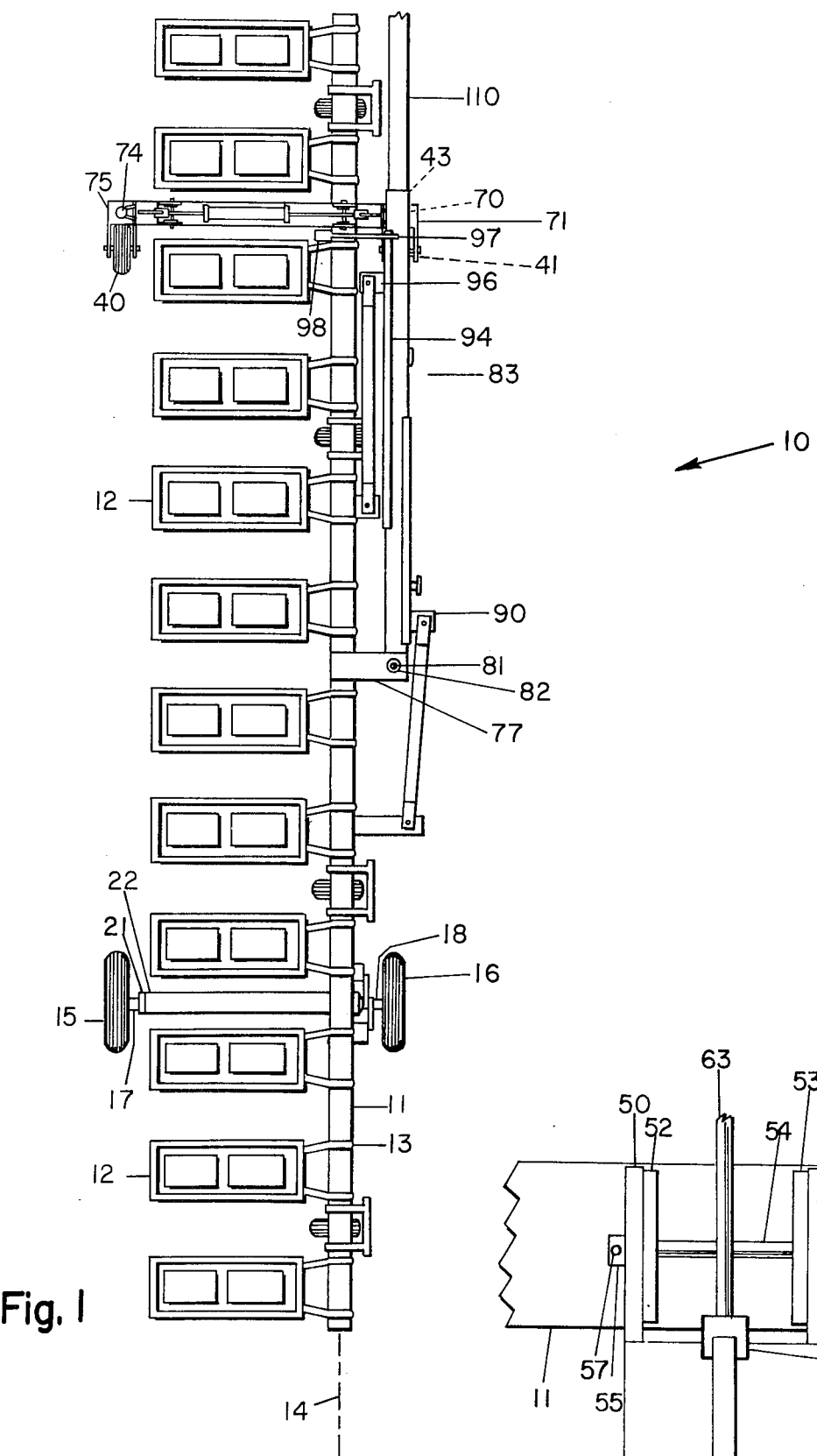
FIG. 1 is a top, plan view of the apparatus of the present invention shown in the transport condition.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated herein being contemplated as would normally occur to one skilled in the art to which the invention relates.

Referring now in particular to the drawings, there is shown the farm apparatus 10 of the present invention. Apparatus 10 comprises an elongated, rectangular tool bar 11. Mounted upon tool bar 11 as desired are several planters, such as 12, secured to tool bar 11 by brackets 13 in accordance with known methods. Tool bar 11 has a longitudinal axis 14, and the planters 12 are positioned to be used when the tool bar 11 is moved over the ground in a direction perpendicular to the longitudinal axis 14.

The first pair of wheels 15 and 16 are mounted to tool bar 11 near an end of the tool bar. Wheels 15 and 16 are rotatably mounted upon axle 17 and 18, respectively, which are aligned perpendicular to axis 14. Wheels 15 and 16 and the respective axles 17 and 18 are preferably fixed in the described condition such that the wheels are useful in transporting the tool bar 11 over the ground only in a direction parallel to axis 14, as will be more fully described below.

Figure 3:
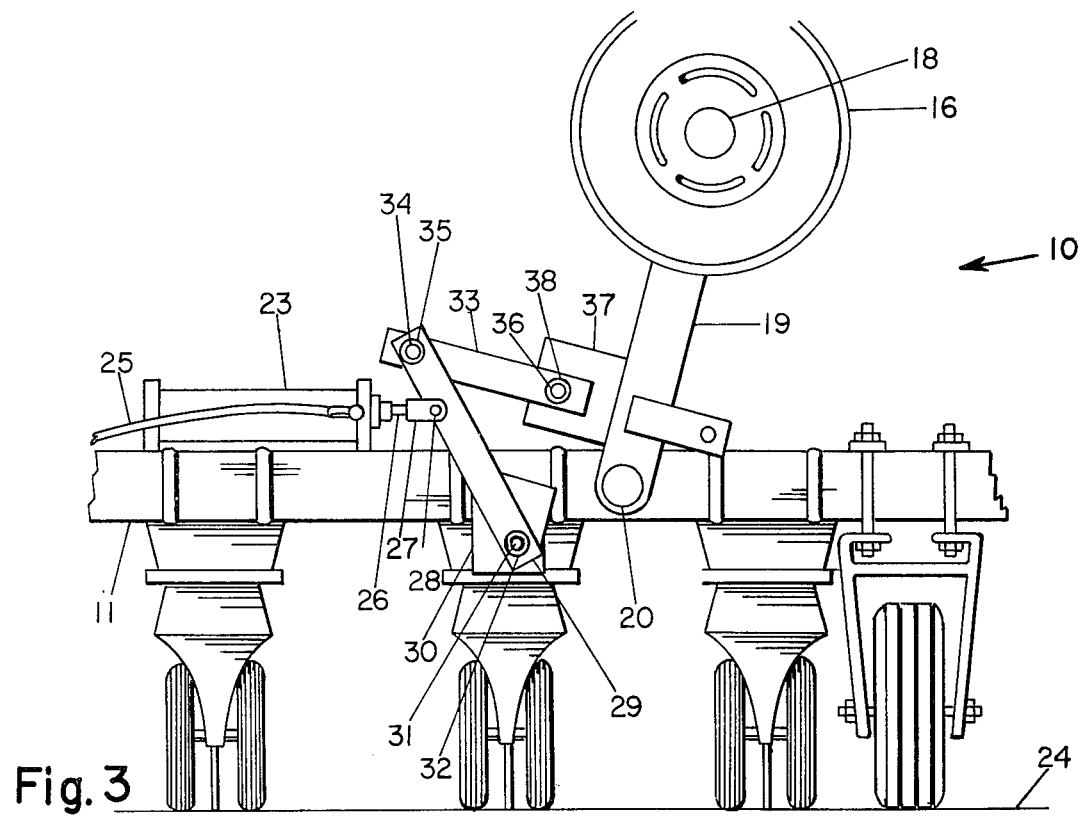
FIG. 3 is a front, elevational view of a portion of the apparatus of the present invention showing one pair of the transport wheels in the up or field position.
Figure 4:
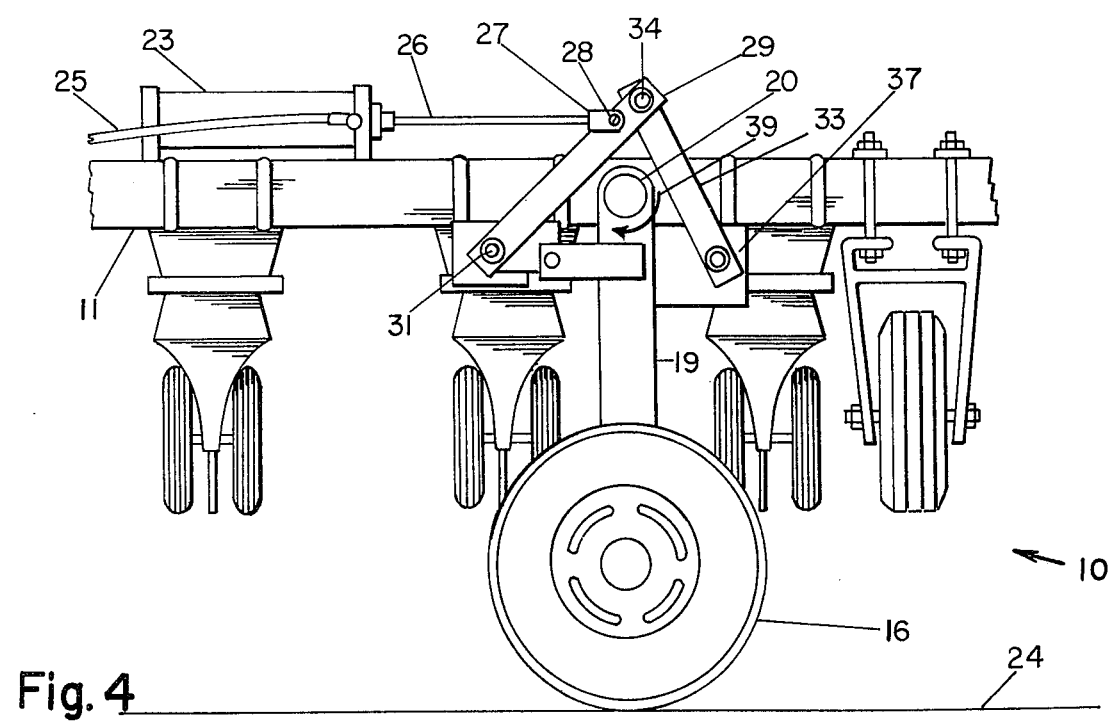
FIG. 4 is a front, elevational view as shown in FIG. 3, with the wheels shown in the down or transport position.

Referring in particular to FIGS. 3 and 4, it is shown that wheels 15 and 16 are operable through a hydraulic system to be rotated into and out of contact with the ground. Wheel 16 is rotatable about axle 18 which is mounted upon support 19 (FIG. 3). Support 19 includes an aperture within which shaft 20 is received, support 19 being secured to shaft 20 as by welding. Similarly, axle 17, upon which wheel 15 is rotatably mounted, is secured to a support 21 (FIG. 1) which is attached to shaft 20. Thus, movement of shaft 20 results in corresponding movement of supports 19 and 21, and thereby of wheels 15 and 16, respectively. Shaft 20 extends through tool bar 11 and also through support member 22, support 21 being attached to shaft 20 adjacent support member 22 (FIG. 1).

As shown particularly in FIGS. 3 and 4, a hydraulic cylinder 23 is mounted upon tool bar 11 and is operable to move wheels 15 and 16 into and out of contact with the ground 24. Lines, such as 25, connect to a source of hydraulic pressure, and are controllable to transmit this hydraulic pressure through hydraulic cylinder 23 to piston rod 26, in accordance with known hydraulic operation. Wheels 15 and 16 have a first or "field" position in which shaft 20 is rotated relative tool bar 11 to position the wheels above the tool bar and off the ground. In correspondence with this first position (FIG. 3), piston rod 26 is retracted within hydraulic cylinder 23.

Piston rod 26 connects through yoke 27 and pin 28 to member 29. Pin 28 is rotatably received within an aperture defined by member 29. Member 29 is attached at one end to support block 30 which is secured to tool bar 11 as by welding. Shaft 31 is mounted to support block 30 and is received within an aperture defined by the first end of member 29. Collar 32 is secured to shaft 31, and thereby retains member 29 on shaft 31. Collar 32, and similar collars used throughout the apparatus may be secured to shaft 31 by a variety of known means, such as by welding or by the use of a set screw in known fashion.

Member 29 is attached at its second end to member 33. A shaft 34 is secured to one end of member 33, and is received within an aperture defined by the second end of member 29. A collar 35 is secured to shaft 34 and retains member 29 thereon. The second end of member 33 is rotatably received upon a shaft 36 mounted to support block 37. Support block 37 is secured to support 19 as by welding. A collar 38 is secured to shaft 36 and retains member 33 thereon.

As shown in FIG. 4, wheels 15 and 16 have a second or "transport" position corresponding to the wheels being rotated into contact with the ground 24. Movement of the wheels 15 and 16 from the first position (FIG. 3) to the second position (FIG. 4) is effectuated by the extension of piston rod 26 from hydraulic cylinder 23. Upon extension of piston rod 26 from hydraulic cylinder 23, member 29 is rotated about shaft 31, and also rotates about shaft 34. In doing so, member 29 acts through member 33 and support block 37 to force shaft 20 to rotate in the direction of arrow 39, moving wheel 16, and similarly wheel 15, into contact with the ground 24. Consequently, the tool bar 11 and associated equipment is raised above the ground and the apparatus may be transported as will be more fully described below. Conversely of the above description, wheels 15 and 16 may be moved out of contact with the ground 24 to put the apparatus 10 into the operating or field position. This is accomplished by withdrawing piston rod 26 into hydraulic cylinder 23, causing the wheels 15 and 16 to move from the second position (FIG. 4) to the first position (FIG. 3).

Referring again to FIGS. 1 and 2, it is shown that a second pair of wheels 40 and 41 are mounted with the associated wheel assemblies near the second end of tool bar 11. As will be apparent from the following description, a single wheel could be used in place of the pair of wheels 40 and 41, but it is preferred that a pair of wheels be used to provide stability for transportation of the apparatus 10. Wheels 40 and 41 are caster wheels and thus are positionable to permit the end of the tool bar 11 at which they are located to move upon the wheels either in a direction parallel to or perpendicular to axis 14. Wheel 41 is rotatably mounted within a yoke 42 having a central portion 71 which is connected with support 43. Yoke 42 is rotatable about axis 44, and thus permits the position of wheel 41 to vary to permit different directions of movement of tool bar 11 upon the ground. Similarly, wheel 40 is rotatably mounted within yoke 45, yoke 45 having a central portion 75 secured to support 46 and rotatable about axis 47.

Figure 5:
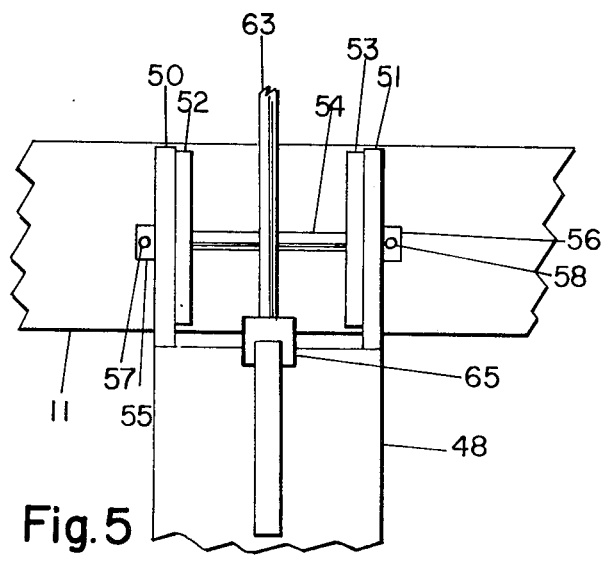
FIG. 5 is a top, plan view of the connection of the hydraulic cylinder to one of the caster wheels of the present invention.

Supports 43 and 46 are attached to support blocks 48 and 49, respectively, support blocks 48 and 49 being pivotally attached to tool bar 11 in identical fashions. As shown in FIG. 5 with respect to support block 48, the support block includes a pair of extensions 50 and 51 which are attached to the support block 48 as by welding. A pair of upright bracket members 52 and 53 are secured to tool bar 11 and support a rod 54 received within apertures defined by members 52 and 53. Extensions 50 and 51 include apertures within which opposite ends of rod 54 are received. Collars 55 and 56 are secured to the ends of rod 54, such as by bolts 57 and 58, respectively, which extend through the respective collars and ends of the rod. Collars 55 and 56 retain rod 54 in place, whereby support block 48 and extensions 50 and 51 are pivotable about the longitudinal axis of rod 54. Support block 49 is similarly mounted to support 59 which is attached to and extends rearwardly from tool bar 11. Support block 49, for example, includes extension 60 (FIG. 6) which is pivotable about rod 61.

A hydraulic cylinder 62 includes piston rod 63 which is operable through the introduction of hydraulic fluid pressure through lines, such as 132, to extend or withdraw the piston rod with respect to hydraulic cylinder 62. Piston rod 63 is connected through yoke 65 to mounting flange 66 secured at the top of support block 48. Cylinder 62 includes a member 64 which is connected through yoke 67 to mounting flange 68 secured at the top of support block 49. Wheels 40 and 41 have a first position (FIGS. 1 and 2) in which the piston rod 63 is extended from hydraulic cylinder 62 and the wheels are in contact with the ground. Upon withdrawal of piston rod 63 into hydraulic cylinder 62, support blocks 48 and 49, respectively, are caused to pivot upon the respective rods 54 and 61, rotating wheels 41 and 40 upwardly and off the ground.

Figure 6:
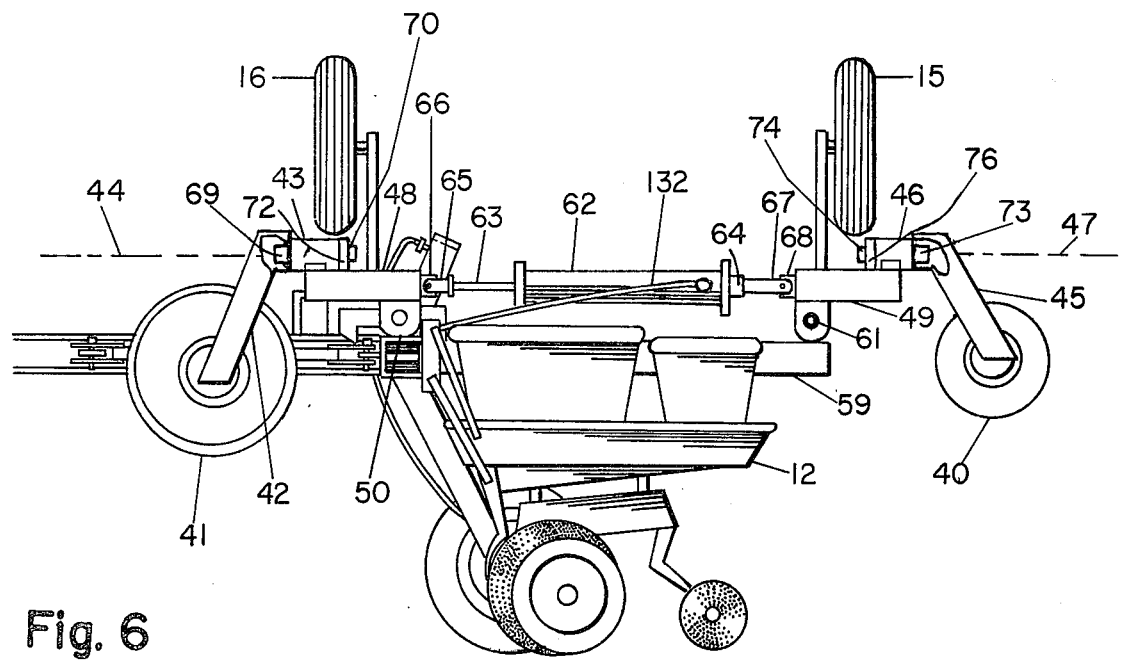
FIG. 6 is an end, elevational view of the present invention showing the caster wheels in the up or field position.
Figure 8:
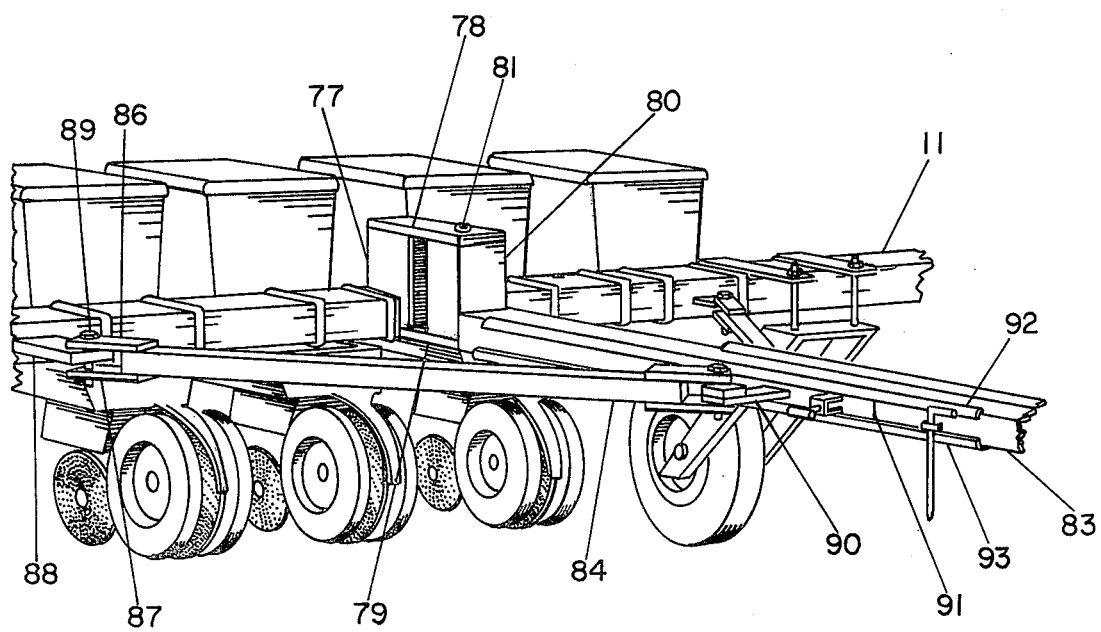
FIG. 8 is a partial, perspective view of the present invention showing in particular the construction of the pivotable cross braces.
Figure 9:
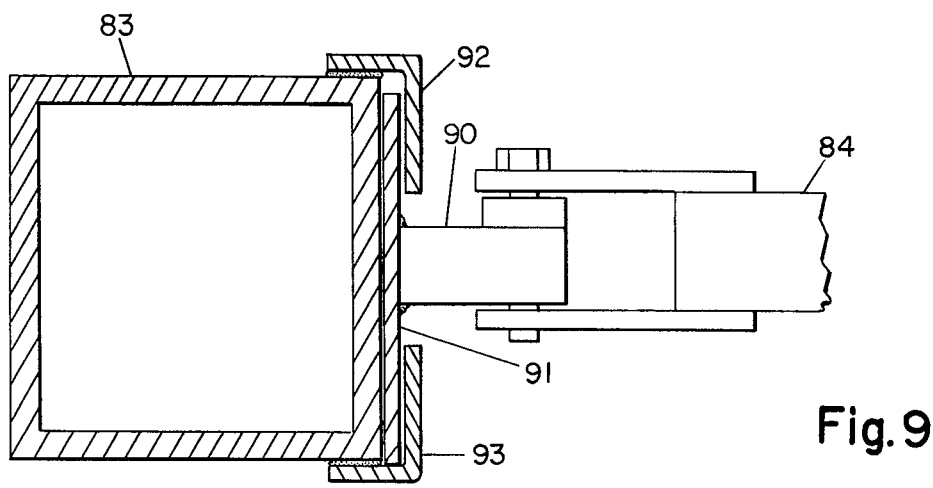
FIG. 9 is a cross-sectional view through the arm of the present invention and showing the attachment of the sliding plate of one of the cross braces to the arm.

The construction of the wheel assemblies supporting wheels 40 and 41 upon tool bar 11 provide for the wheels to be oriented either with the axis of rotation parallel to or perpendicular to the longitudinal axis of tool bar 11. Referring in particular to FIG. 6, wheel 41 is shown to be mounted upon an axle attached to yoke 42. Yoke 42 is connected through support 43 to support block 48. Support 43 is a cylindrical member which rotatably receives a solid shaft 69 therein. Shaft 69 is welded to yoke 42 and extends through support 43. A large washer 72 is held adjacent cylindrical support 43 by a cap screw 70 which is threadedly received by solid shaft 69. Yoke 42 is thereby pivotable about the longitudinal axis 44 of shaft 69. Similarly, solid shaft 73 extends through cylindrical support 46 and is welded to yoke 45. A washer 76 is held against one end of support 46 by cap screw 74, which is threadedly received by solid shaft 73. Yoke 45 is thereby pivotable about the longitudinal axis 47 of shaft 73.

A support block 77 is mounted upon tool bar 11. Extensions 78 and 79 are attached to the upper and lower ends of support block 77, and extend forwardly of tool bar 11. A support block 80 defining a central aperture within which the rod 81 is received. Rod 81 extends through extensions 78 and 79 and also through support block 80, rod 81 being held in position by collars such as 82, which are attached to the ends of the rod exteriorly of extensions 78 and 79. Arm 83 is secured to support block 80 and is thereby pivotable about the longitudinal axis of rod 81.

Braces 84 and 85 are connected between tool bar 11 and arm 83 is similar fashions. As shown for example in FIG. 7, brace 84 includes a pair of connecting members 86 and 87 secured at one end. A mounting flange 88 is secured to tool bar 11, and is received between connecting members 86 and 87. A bolt 89 is received within aligned apertures defined by connecting members 86 and 87 and by mounting flange 88, thus pivotally connecting brace 87 to tool bar 11. A similar mounting arrangement connects the opposite end of brade 84 to a mounting flange 90 located upon a sliding plate 91 received within channel members 92 and 93 secured to arm 83. Similarly, brace 85 is pivotally connected at one end to tool bar 11, and at the other end is pivotally connected to a sliding plate received within channel members, such as 94, secured to arm 83. In this fashion, arm 83 may be pivoted with respect to rod 81, and therefore tool bar 11, with braces 84 and 85 pivoting about mounting flanges 88 and 95, respectively. At the same time, the opposite ends of braces 84 and 85 pivot about mounting flanges 90 and 96 as the plates, such as 91, slide within the respective channels on arm 83.

Arm 83 has a first position (FIG. 1) in which the arm is pivoted about rod 81 to be essentially parallel with tool bar 11. In this position, mounting flange 90 an the associated sliding plate are positioned adjacent the support block 77, whereas mounting flange 96 and the associated sliding plate are moved to their furthest location from support block 77. A hook member 97 is attached to a support 98 and is pivotable about a horizontal axis through support 98. With arm 83 in the first position (FIG. 1), hook member 97 engages the upper channel member 94, thereby retaining arm 83 in the first position adjacent and essentially parallel to tool bar 11.

Arm 83 has a second position (FIG. 2) perpendicular to tool bar 11. In the second position, braces 84 and 85 are symmetrically positioned on opposite sides of arm 83, with mounting flanges 90 and 96 being positioned opposite one another. Referring in particular to FIG. 7, a spring loaded locking pin 99 having a handle portion 100 secures arm 83 in the second position perpendicular to tool bar 11. A U-shaped mounting bracket 101 is welded to sliding plate 91, the sliding plate being received within channel members 92 and 93. Locking pin 99 extends through an aperture defined by wall 102 of mounting bracket 101, and also extends through apertures defined by sliding plate 91 and wall 103 of arm 83. A pin 104 extends diametrically through an aperture defined by locking pin 99. A compression, coil spring 105 is positioned about locking pin 99 and bears against the interior of wall 102 and also against pin 104, thus urging locking pin 99 in the direction of arrow 106. In this manner, locking pin 99 retains sliding plate 91 in position relative bar 83, and precludes the pivoting of bar 83 about rod 81. Locking pin 99 may be released by moving the locking pin in the direction of arrow 107, thereby disengaging locking pin 99 from the aperture 108 defined by wall 102 of arm 83, whereby sliding plate 91 is free to move relative arm 83. Arm 83 is thereby pivotable about rod 81 when locking pin 99 is disengaged from aperture 108.

A ledge 109 is provided to permit the locking pin to be held in the disengaged position to permit relative movement of sliding plate 91 and arm 83. In use, locking pin 99 is moved in the direction of arrow 107 by pulling on handle 100, and pin 104 is positioned upon ledge 109. Engagement of pin 104 with ledge 109 will prevent the coil spring 105 from urging the locking pin 99 in the direction of arm 83 to a sufficient extent to engage within aperture 108.

Figure 10:
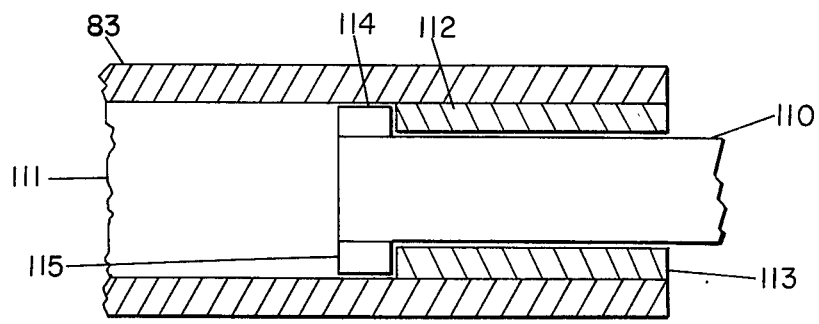
FIG. 10 is a top, cross-sectional view of the connection of the arm and the extension utilized in the present invention.
Figure 11:
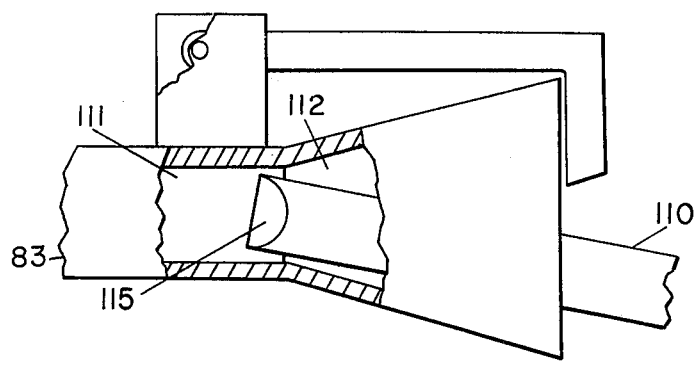
FIG. 11 is a side, partial cross-sectional view of the connection shown in FIG. 10.

Arm 83 includes a telescoping extension 110 which is receivable within the interior 111 of arm 83. Extension 110 has a first position (FIGS. 10 & 11) relative arm 83 in which the extension 110 is fully extended from the interior 111 of arm 83. Arm 83 includes a flared opening, with retainer blocks 112 and 113 mounted within the expanded opening. Semi-cylindrical members 114 and 115 are secured to the end of extension 110 and are positioned to engage retainer blocks 112 and 113 upon movement of extension 110 outwardly from arm 83. Extension 110 thereby may be extended from arm 83 to the point at which the members 114 and 115 engage the retainer blocks 112 and 113, respectively. The expanded opening of arm 83 further permits vertical movement of extension 110 relative the opening of arm 83, thus facilitating transportation of the apparatus to and from the field. A spring loaded set pin (not shown) is preferably mounted upon arm 83 to extend into interior 111 behind extension 110 upon full withdrawal of extension 110 from arm 83, thereby preventing the extension from moving back into arm 83. This set pin is preferably constructed as described with respect to locking pin 99 in FIG. 7.

Figure 12:
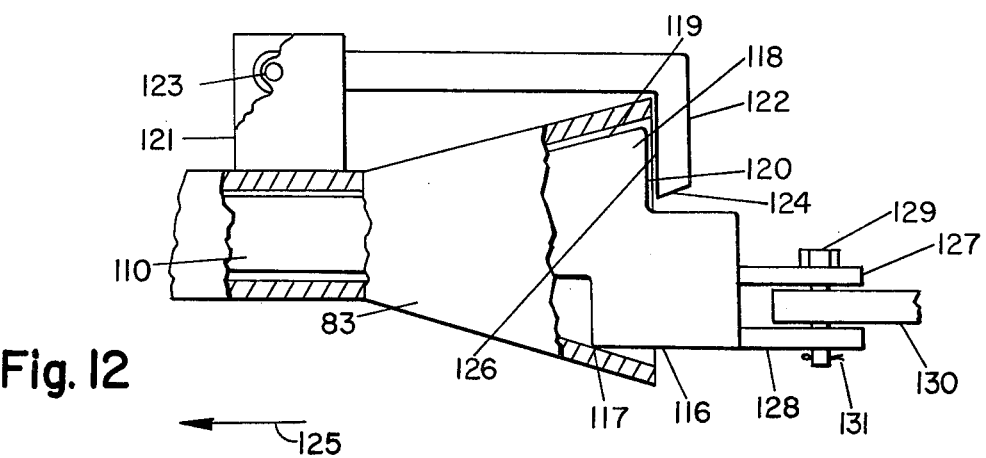
FIG. 12 is a side, partial, cross-sectional view as shown in FIG. 11 with the extension shown fully withdrawn within the arm.

Extension 110 has a second position (FIG. 12) relative arm 83 in which extension 110 is fully withdrawn within arm 83. Extension 110 includes an enlarged portion 116 which upon full withdrawal of extension 110 within arm 83 contacts the bottom of the opening of arm 83 at location 117. Extension 110 further includes a sloped portion 118 which has a surface 119 disposed at an angle to the top of the extension 110. Sloped portion 118 further includes a second surface 120 which is disposed perpendicular to the top of extension 110. A supporting yoke 121 is secured to the top of arm 83. A hook member 122 is pivotally supported by yoke 21 by reception of pin 123 within an aperture defined by hook member 122. Hook member 122 includes a surface 124 which engages and rides upon surface 119 of sloped portion 118 as extension 110 is moved into arm 83 in the direction of arrow 125. Hook member 122 further includes a surface 126 which is positioned to engage surface 120 of sloped portion 118 when extension 110 is fully withdrawn within arm 83. Extension 110 is thereby prevented by hook member 122 from being pulled out of arm 83 when hook member 122 is positioned to engage surface 120. The bearing of portion 116 upon arm 83 at location 117 retains extension 110 in position to be engaged by hook member 122. Hook member 122 may be raised by pivoting about pin 123 to permit extension 110 to be extended from within arm 83. As will be more fully described below, the first position of extension 110 corresponds to the transport condition of the apparatus described herein, whereas the second position of the extension 110 correspnds to the infield condition of the apparatus.

A pair of mounting flanges 127 and 128 are connected to portion 116 of extension 110. Mounting flanges 127 and 128 define aligned apertures within which a bolt 129 is received for attachment of the apparatus to a tongue 130 provided upon a tractor or other vehicle intended for transporting the apparatus. A pin 131 is extended through an aperture defined by bolt 129 to retain the bolt in position during connection of the apparatus to the tongue 130.

As is apparent from the figures together with the foregoing description, the farm apparatus 10 of the present invention provides a unit having a first or transport condition and a second or field condition. The construction of the farm apparatus provides for the rapid and easy transformation of the apparatus from the transport condition to the field condition, and back to the transport condition. For the purposes of description, it will be assumed that the apparatus is initially in the transport condition as shown in FIG. 1. While in the transport condition, the wheels 15 and 16 and the wheels 40 and 41 are in their lowered position to contact the ground. Arm 83 is pivoted about rod 81 to be positioned essentially parallel to tool bar 11. Hook 97 engages rail 94 on arm 83 to retain the tool bar in the first position. Extension 110 connected to arm 83 is attached by means of mounting flanges 127 and 128 to the tongue 130 of a suitable towing vehicle. The wheels 15, 16, 40 and 41 are oriented to carry the tool bar 11 and associated equipment in a direction parallel to the longitudinal axis 14 of tool bar 11. The enlarged opening of the interior 111 of arm 83 permits the extension 110 to pivot vertically about member 114 and 115 to accommodate the varying terrain over which the farm apparatus may be transported.

Once in the field, the farm apparatus 10 is converted to the field position, and this is accomplished without the disengagement of the towing vehicle from the apparatus. Wheels 15, 16, 40 and 41 remain in the down position to support the tool bar and associated equipment above the ground. Hook member 97 is supported in an up position to be disengaged from rail 94 to permit the subsequent pivoting of arm 83 about rod 81. Hook member 97 may be supported in the up position, for example, by connection of a suitable member from the end of the hook to a nearby portion of the tool bar to support it above the position required to engage rail 94. The tractor or other vehicle connected to the apparatus is then manipulated to cause the tool bar 11 to move along wheels 40 and 41 away from arm 83. Since the wheels 40 and 41 are mounted to the tool bar to be castered, or in other words to pivot about a vertical axis, the wheels will quickly assume an orientation to permit that end of the tool bar to move perpendicularly to the longitudinal axis 14. Since the wheels 15 and 16 are mounted without previson for pivoting about a vertical axis, they will resist movement of their end of tool bar 11 in a direction other than parallel to axis 14. As a result, the appropriate movement of the tractor will cause the tool bar 11 and associated equipment to essentially pivot about the wheels 15 and 16, thereby permitting arm 83 to be moved to a position perpendicular to the tool bar 11.

When the arm 83 has been moved to the fully perpendicular position relative tool bar 11 (FIG. 2), the spring-biased locking pin 99 will automatically engage within aperture 108 defined by wall 103 (FIG. 7) when the sliding plate 91 has moved along the associated rails to align the pin with the aperture 108. Thus, as the arm 83 is moved closer to perpendicular with tool bar 11, the sliding plates, such as 91, will move within the associated channels to permit cross braces 84 and 85 to pivot and move relative arm 83. Once in the perpendicular position, as previously described, locking pin 99 will engage within the aperture 108 defined by arm 83 and pivotal movement will thereby be prevented. Extension 110 is then moved into the interior 111 of arm 83 by moving the tractor in the direction of the tool bar 11. When extension 110 is fully withdrawn into the interior of arm 83, hook member 122 will engage the surface 120 to retain the extension 110 in the withdrawn position. The appropriate hydraulic controls are then operated to raise the wheels 15, 16, 40 and 41 above the ground to permit the equipment mounted on the tool bar 11 to engage the ground for use. A long safety pin 130 (FIG. 2) is installed through both walls of arm 83 and both walls of extension 110, as well as through plates, such as 91, to retain the extension 110 within arm 83. The farm apparatus 10 of the present invention is then fully put into the field position.

Conversely, the apparatus 10 is easily and readily transformed from the field condition to the transport condition. With the apparatus in the field condition as previously described, locking pin 99 is withdrawn from hole 108 and secured in a disengagement position as described in the text above. The extension 110 is also withdrawn from the interior of arm 83 by securing hook member 122 in a raised condition out of engagement with surface 120. Again, this may be accomplished as by attaching a member to the end of the hook member 122 and to a nearby portion of the apparatus to hold it in the raised condition as the extension 110 is withdrawn from arm 83. Extension 110 is easily withdrawn by simply moving the tractor or other vehicle in a direction away from tool bar 11, whereby extension 110 will be withdrawn from arm 83 until members 114 and 115 engage retainer blocks 112 and 113, respectively. Wheels 15, 16, 40 and 41 are then lowered to contact the ground and raise the tool bar and associated equipment off of the ground.

The tractor is then manipulated to cause the end of the tool bar 11 at which wheels 40 and 41 are mounted to move in the direction of arm 83. Hook member 97 is released from its prior position in which it was secured in a raised position, and is thereby freed to engage rail 94 as arm 83 approaches tool bar 11. At the same time, the release of locking pin 99 permits arm 83 to pivot about rod 81, at which time the sliding plates, such as 91, will move within the associated channels mounted upon arm 83. As previously described, the orientation of wheels 15 and 16 will cause that end of the tool bar 11 to resist movement other than parallel to axis 14, and the tool bar will thus essentially pivot about wheels 15 and 16 as arm 83 is brought into position parallel to tool bar 11. Once parallel with tool bar 11, arm 83 will be engaged by hook member 97 which will hold the arm 83 in the first or transport position. The tractor may then move in the direction parallel with axis 14 of tool bar 11, and the castered wheels 40 and 41 will change orientation to permit transportation of the tool bar in that direction.

It has been shown by the above description that the farm apparatus 10 of the present invention provides a tool bar and associated elements which may be transformed from a field position to a transport position without disengagement of the transporting vehicle. Further, this transformation is readily conducted by the release of the appropriate locking mechanisms and the pivoting of the towing arm 83 about a rod connected to the tool bar 11.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A farm apparatus movable by connection to a transporting vehicle comprising:
   a frame including an elongated tool bar having a first end and a second end;
   first attaching means for securing farm implements to the tool bar;
   a first wheel assembly mounted to said frame near the first end of the tool bar, said first wheel assembly including a first wheel rotatable about a horizontal axis;
   first mount means for mounting said first wheel assembly to said frame to be pivotable about a vertical axis;
   a second wheel assembly mounted to said frame near the second end of the tool bar, said second wheel assembly including a second wheel rotatable about a horizontal axis;
   second mount means for mounting said second wheel assembly to said frame;
   means for vertically moving said first and second wheels relative said frame, said first and second wheels having a first position in contact with the ground and a second position above the ground;
   a towing arm attached to said frame;
   second attaching means for attaching said towing arm to said frame to be pivotable about a vertical axis with respect to said frame, said towing arm having a first position parallel to the tool bar and a second position perpendicular to the tool bar;
   first locking means for locking said towing arm in the first position;
   second locking means for locking said towing arm in the second position;
   attaching means for attaching said towing arm in the second position to a transporting vehicle for towing the farm apparatus in a field and
   for attaching said towing arm in the first position to a transporting vehicle for towing the farm apparatus to and from a field.

2. The apparatus of claim 1 in which said attaching means comprise an extension connected to said towing arm, said extension being telescopically received by said towing arm, said extension having a first position in which it is extended from said towing arm and a second position in which it is telescoped upon said towing arm, and further comprising means for maintaining said extension in each of the first and second positions.

3. The apparatus of claim 1 and which includes a brace having a first end and a second end, the first end of said brace being pivotally connected to said frame, the second end of said brace being movably connected to and slidable along said towing arm, and further comprising means for movably attaching the second end of said brace to said towing arm.

4. The apparatus of claim 3 and futher comprising a second brace having a first end and a second end, the first end of said second brace being pivotally connected to said frame at a location on one side of said towing arm opposite the side of said towing arm at which the first end of said first brace is connected, the second end of said second brace being movably attached to and slidable along said towing arm, and further comprising means for movably connecting the second end of said second brace to said towing arm.

5. The apparatus of claim 4 in which said means for connecting the second end of said first brace to said towing arm and for connecting the second end of said second brace to said towing arm comprise first and second pairs of channel members connected to opposite sides of said towing arm and first and second plates slidably received within the first and second pairs of channel members, respectively, the second ends of said first and second braces being pivotally connected to said first and second plates, respectively.

6. The apparatus of claim 5 and further comprising a locking pin mounted upon one of said plates, means for mounting said locking pin onto said plate perpendicular to an adjacent surface of said towing arm, said towing arm defining an aperture in the adjacent surface for reception of a portion of said locking pin therein, and biasing means for urging said locking pin in the direction of said towing arm, said second locking means including said locking pin.

7. The apparatus of claim 5 in which said first locking means comprises a hook member pivotally mounted to said frame, said hook member being positioned to engage said towing arm when said towing arm is in the first position.

8. The apparatus of claim 1 in which said second mount means is for mounting said second wheel assembly to said frame to permit the second wheel to rotate only about a horizontal axis oriented perpendicular to the tool bar, said towing arm in the first position extending in a direction away from the second wheel, whereby the pivotable first wheel permits the first end of the tool bar to move toward said towing arm as said towing arm is moved from the second position to the first position.

9. The apparatus of claim 1 in which said first wheel assembly includes a third wheel rotatable about a horizontal axis, the first and third wheels being rotatable about parallel axes.

10. The apparatus of claim 9 in which said second wheel assembly includes a fourth wheel rotatable about a horizontal axis, the second and fourth wheels being rotatable about parallel axes.

11. The apparatus of claim 1 and which includes means for moving said towing arm between the first and second positions while maintaining attachment of said towing arm to a transporting vehicle.

12. The apparatus of claim 11 in which said means for moving and said attaching means comprise an extension connected to said towing arm, said extension having a first position in which it is extended from said arm, said towing arm being in the first position parallel to the tool bar and said extension being in the first position to permit towing the apparatus to and from a field, said extension having a second position in which it is retracted toward said towing arm, said towing arm being in the second position perpendicular to the tool bar and said extension being in the second position to permit towing the apparatus in a field.

13. The apparatus of claim 3 in which said means for connecting the second end of said first brace to said towing arm comprises a pair of channel members connected to said towing arm and a plate slidably received within the channel members, the second end of said brace being pivotally connected to said plate.

14. The apparatus of claim 13 and further comprising a locking pin mounted upon said plate, means for mounting said locking pin onto said plate perpendicular to an adjacent surface of said towing arm, said towing arm defining an aperture in the adjacent surface for reception of a portion of said locking pin therein, and biasing means for urging said locking pin in the direction of said towing arm, said second locking means including said locking pin.

15. The apparatus of claim 13 in which said first locking means comprises a hook member pivotally mounted to said frame, said hook member being positioned to engage said towing arm when said towing arm is in the first position.

16. The apparatus of claim 1 and further comprising a transporting vehicle attached to said towing arm in each of the first and second positions.

* * * * *